(12) United States Patent
Waldherr et al.

(10) Patent No.: US 10,400,805 B2
(45) Date of Patent: Sep. 3, 2019

(54) METHOD FOR CONNECTING A BALL TO A FIRST COMPONENT IN A POSITIVELY LOCKING MANNER

(71) Applicant: Bayerische Motoren Werke Aktiengesellschaft, Munich (DE)

(72) Inventors: Christian Waldherr, Malgersdorf (DE); Richard Weizenberger, Aidenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 379 days.

(21) Appl. No.: 15/379,685

(22) Filed: Dec. 15, 2016

(65) Prior Publication Data

US 2017/0097029 A1 Apr. 6, 2017

Related U.S. Application Data

(63) Continuation of application No. PCT/EP2015/063149, filed on Jun. 12, 2015.

(30) Foreign Application Priority Data

Jun. 18, 2014 (DE) .................. 10 2014 211 660

(51) Int. Cl.
  *F16B 5/00* (2006.01)
  *B23P 11/00* (2006.01)
  (Continued)

(52) U.S. Cl.
  CPC ........... *F16B 11/002* (2013.01); *B23P 11/005* (2013.01); *F16B 5/0096* (2013.01);
  (Continued)

(58) Field of Classification Search
  CPC .............. B23P 11/005; Y10T 29/49853; Y10T 29/49938; Y10T 29/49915; F16B 11/002; F16B 5/0096; F16B 17/00; B23K 37/0417
  See application file for complete search history.

(56) References Cited

U.S. PATENT DOCUMENTS 5,769,554 A 6/1998 Slocum
8,230,571 B2 7/2012 Kovac
(Continued)

FOREIGN PATENT DOCUMENTS

CN 103124670 A 5/2013
DE 10 2009 037 817 A1 4/2011
(Continued)

OTHER PUBLICATIONS

Chinese-language Office Action issued in counterpart Chinese Application No. 201580032337.3 dated Feb. 2, 2018 with English translation (Seventeen (17) pages).
(Continued)

*Primary Examiner* — Jermie E Cozart
(74) *Attorney, Agent, or Firm* — Crowell & Moring LLP

(57) ABSTRACT

A method is provided for connecting a ball to a first component having the following steps: providing a first component which has a through-hole; providing a ball and inserting the ball into the through-hole such that the ball protrudes out of the first component at opposite sides of the first component; placing a first pressing tool on the ball from a first side of the first component and placing a second pressing tool on the ball from a second side of the first component; plastically deforming the ball by pressing together the pressing tools, wherein material of the ball flows both on the first side as well as on the second side of the first component, such that material of the ball covers an edge of the through-hole on the first side and on the second
(Continued)

side of the first component, whereby a formfitting connection is produced between the ball and the first component.

12 Claims, 2 Drawing Sheets

(51) Int. Cl.
*F16B 11/00* (2006.01)
*F16B 17/00* (2006.01)
*B23K 37/04* (2006.01)

(52) U.S. Cl.
CPC .......... *F16B 17/00* (2013.01); *B23K 37/0417* (2013.01); *Y10T 29/49853* (2015.01); *Y10T 29/49915* (2015.01); *Y10T 29/49938* (2015.01)

(56) References Cited

U.S. PATENT DOCUMENTS

2013/0212858 A1 8/2013 Herzinger et al.
2013/0269873 A1 10/2013 Herzinger et al.
2014/0294488 A1 10/2014 Van Niekerk et al.
2015/0033532 A1 2/2015 Van Niekerk et al.

FOREIGN PATENT DOCUMENTS

| DE | 10 2010 063 717 A1 | 6/2012 |
| DE | 10 2012 206 938 B3 | 2/2013 |
| DE | 10 2012 212 101 B3 | 7/2013 |
| DE | 10 2012 203 217 A1 | 9/2013 |
| EP | 2 698 549 A1 | 2/2014 |
| GB | 560251 | 3/1944 |

OTHER PUBLICATIONS

Chinese-language Office Action issued in counterpart Chinese Application No. 201580032337.3 dated Aug. 16, 2018 with English translation (18 pages).
International Search Report (PCT/ISA/210) issued in PCT Application No. PCT/EP2015/063149 dated Aug. 19, 2015, with English translation (four (4) pages).
German Office Action issued in counterpart German Application No. 10 2014 211 660.0 dated Apr. 30, 2015 (six (6) pages).

METHOD FOR CONNECTING A BALL TO A FIRST COMPONENT IN A POSITIVELY LOCKING MANNER

CROSS REFERENCE TO RELATED APPLICATIONS

This application is a continuation of PCT International Application No. PCT/EP2015/063149, filed Jun. 12, 2015, which claims priority under 35 U.S.C. § 119 from German Patent Application No. 10 2014 211 660.0, filed Jun. 18, 2014, the entire disclosures of which are herein expressly incorporated by reference.

BACKGROUND AND SUMMARY OF THE INVENTION

The present invention relates to a method for connecting a ball to a first component in a positively locking (form-fitting) manner as well as to a component connection so formed.

Component connections having spherical connecting elements are known, for example, from DE 10 2012 206 938 B3 or DE 10 2012 212 101 B3. There, connecting elements are used which consist of a ball or of a plurality of balls which are connected to one another. Here, the connecting elements are welded onto a first component.

It is an object of the invention to provide an alternative method for connecting a connecting element to a component and a component connection which is based on said method.

This and other objects are achieved by way of the method for connecting a ball to a first component and to a component connection formed by the method in accordance with embodiments of the invention.

In order to carry out the method according to the invention, first of all a first component is provided which has a through hole. The first component can be, for example, a metal sheet, in particular a steel sheet or an aluminum sheet. As an alternative to this, the first component can also be a component made from plastic, for example a plastic panel, in particular a plastic component which is reinforced by fibers, such as glass fibers, carbon fibers or the like.

Furthermore, a connecting element is provided which is formed by a ball or which has at least one ball. The connecting element is introduced into the through hole of the first component in such a way that the ball protrudes out of the first component on sides of the first component which lie opposite one another.

Subsequently, a first pressing tool is set against the ball from a first side of the first component, and a second pressing tool is set against the ball from a second side of the first component which lies opposite the first side.

The ball is deformed plastically by way of pressing together of the pressing tools, to be precise in such a way that material of the ball flows both on the first and on the second side of the first component such that material of the ball projects beyond an edge of the through hole on the first side and on the second side of the first component. This results in a positively locking (form-fitting) connection of the ball to the first component.

The ball is therefore deformed in such a way that a plastically deformed edge region of the ball engages over the edge of the first component in a clamp-like manner. As viewed in a cross section which runs through the ball and the first component, the plastically deformed edge region of the ball has a U-shaped design, the "limbs of the U" projecting beyond the through hole on both sides of the first component. It can be provided that, as viewed in a cross section which runs through the ball and the first component, a center region of the ball remains completely or largely non-deformed, that is to say continues to have a spherical shape completely or largely even after the deformation of the ball.

As has already been indicated, the ball can also be called a "connecting element" and/or the ball can form a part (section) of a connecting element which consists of further elements. The term "ball" is not necessarily restricted to an exact ball geometry in the mathematical sense, but rather can also comprise ball-like elements.

As has already been stated, the connecting element according to the invention can consist of a single ball. As an alternative to this, the connecting element can also consist of two balls or a plurality of balls which are connected to one another (multiple ball). In the case of a connecting element which consists of precisely two balls, this can also be called a "double ball".

The individual balls of a connecting element of this type can be welded to one another or can be connected to one another in a different way. A connecting element which consists of a plurality of "part elements" does not have to necessarily consist exclusively of balls, however. A connecting element is also contemplated which has one ball or a plurality of balls, and a different part element, such as a threaded pin, a polygon or the like, projecting from the one ball or from one of the plurality of balls.

In accordance with one aspect of the invention, the ball is introduced into the through hole in such a way that the ball projects out of the first component to approximately, or exactly, the same extent on the first side and on the second side of the first component.

The ball can consist, for example, of a metal material, such as steel or aluminum.

If a "double ball" is used, the ball is already connected fixedly to a second ball before being pressed in. As an alternative to this, it is also contemplated that the ball is first of all connected as a single ball to the first component, and subsequently, that is to say after the plastic deformation of the ball, a second ball or another part element, such as the threaded pin, the polygon or the like, is connected to the plastically deformed ball, in particular by way of welding.

In accordance with one aspect of the invention, as viewed in the direction of a perpendicular bisector of the through hole, the first and/or the second pressing tool are set against the ball in a radial outer region of the latter. By way of pressing the pressing tools together, material of the ball is made to flow radially to the outside in a radial outer region of the ball.

The first pressing tool which is used for this purpose can be of a sleeve-shaped configuration, an end side of the first pressing tool being pressed against the ball in a radial outer region of the ball during pressing together of the pressing tools. Accordingly, the second pressing tool can be of a sleeve-shaped configuration, an end side of the second pressing tool being pressed against the ball in a radial outer region of the ball during pressing together of the pressing tools. The end sides of the pressing tools can be of circularly annular design. Accordingly, it can be provided that the ball is deformed plastically along a part of its circumference or along its entire circumference on both sides of the first component during pressing.

During pressing of the ball, the first component can be clamped in between a first hold-down device (for example, an upper hold-down device) and a second hold-down device (for example, a lower hold-down device). A recess can be provided in the first hold-down, in which recess the first pressing tool is arranged displaceably. The first pressing tool is displaced in the recess during pressing of the ball. Accordingly, a recess can be provided in the second hold-down device, in which recess the second pressing tool is arranged displaceably and is displaced in the recess during pressing of the ball.

A component connection according to the invention will be described in the following text. A component connection in accordance with the invention has a first component with a through hole, and a connecting element which is formed by a ball or which has at least one ball which is introduced into the through hole and which protrudes out of the first component on sides of the first component which lie opposite one another, the ball having been deformed plastically by way of pressing in such a way that material of the deformed ball projects beyond an edge of the through hole on the first side and on the second side of the first component. This results in a positively locking connection between the ball and the first component.

Furthermore, the component connection has a second component which has a through hole or a receiving opening, the connecting element protruding into the through hole or into the receiving opening of the second component.

In accordance with one aspect of the invention, the second component interacts with the connecting element in a positively locking manner, with the result that the two components are centered relative to one another at the location of the connecting element.

The connecting element can be clamped into the through hole or the receiving opening of the second component.

Furthermore, it can be provided that a clip element made from plastic is clipped onto the connecting element. The two components can be held together by way of the clip element. As an alternative to this, it can also be provided that a component which has a "clip-shaped collar" is clipped onto the connecting element.

One component or both components can be a component of a vehicle. In particular, one or both components can be a vehicle body component or vehicle body components.

The two components can be additionally connected to one another in a different manner, for example via a welded connection, an adhesive bond, a riveted connection or the like.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
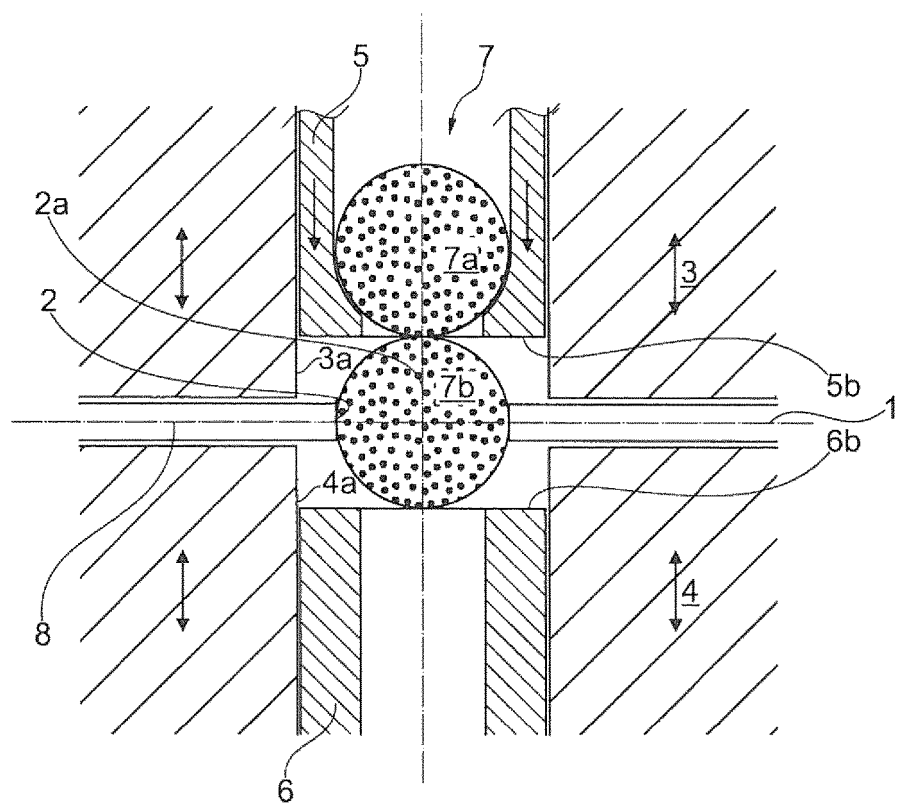
FIG. 1 illustrates a first step for pressing one ball of a double ball to a first component in accordance with an embodiment of the invention.

FIG. 1 shows a first component 1 which can be formed, for example, by way of a steel plate, an aluminum plate, a plastic panel or the like. In the case of a plastic component, the first component can be, in particular, a fiber-reinforced plastic component, that is to say a plastic component, the stability of which is reinforced, for example, by way of glass fibers, carbon fibers or the like. A through hole 2 is provided in the first component 1.

As can be seen from FIG. 1, the first component 1 is clamped inbetween a first hold-down device (upper hold-down) 3 and a second hold-down device (lower hold-down) 4. A cylindrical recess 3a is provided in the upper hold-down 3, in which recess 3a a first pressing tool 5 is arranged displaceably. A cylindrical recess 4a is likewise provided in the lower hold-down 4, in which recess 4a a lower pressing tool 6 is arranged displaceably.

Figure 2:
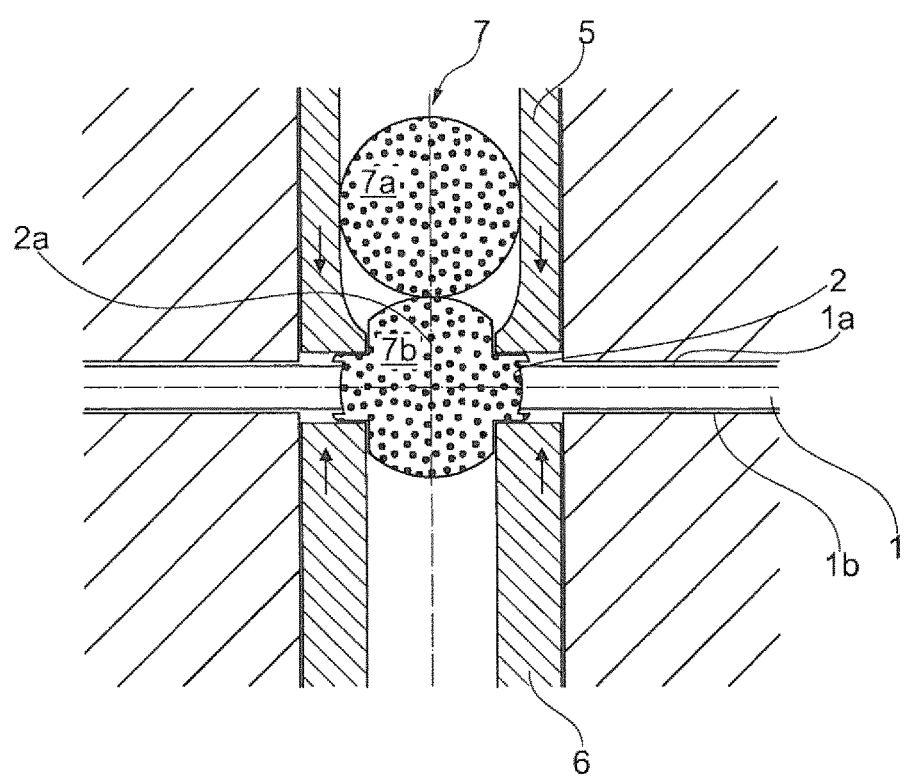
FIG. 2 illustrates a second step for pressing one ball of a double ball to a first component in accordance with an embodiment of the invention.

In the exemplary embodiment which is described in FIGS. 1, 2, a double ball 7 is used which consists of two balls 7a, 7b which are connected to one another. The two balls 7a, 7b can be welded to one another, for example.

It can be provided that the diameter of the lower ball 7b is at most as great as the diameter of the through hole 2. In principle, the lower ball 7b might also have a certain small oversize in relation to the through hole 2. If the ball 7b has an oversize in relation to the ball 2, the double ball or the ball 7b of the double ball 7 would have to be pressed into the through hole 2 with a certain pressing-in force.

The double ball 7 is moved into a position, in which the lower ball 7b protrudes out of the through hole 2 on both sides of the through hole 2 and therefore out of the first component 1. In FIG. 1, the lower ball 7b is arranged symmetrically with regard to the first component, that is to say the center point of the lower ball 7b or its equatorial plane lies in a center plane 8 of the first component 1.

The pressing tools 5, 6 which are used in FIGS. 1, 2 are of sleeve-shaped design. The lower pressing tool 6 can have the shape of a circular cylinder, the internal diameter of which is smaller than the diameter of the lower ball 7b, and the external diameter of which is somewhat smaller than or approximately the same size as the diameter of the recess 4a of the hold-down 4.

The upper pressing tool 5 is likewise of sleeve-like design. During pressing together of the pressing tools 5, 6, end sides 5b, 6b of the pressing tools 5, 6 come into contact with a radial outer region of the lower ball 7b, The radial outer region of the ball 7b is squeezed in between the end sides 5b, 6b of the pressing tools 5, 6, which can be seen best from FIG. 2. The pressing tools 5, 6 are pressed together to such a pronounced extent that the lower ball 7b is deformed plastically. Here, a flow of material of the lower ball 7b occurs in such a way that material of the ball 7b projects beyond an edge of the through hole 2 on a first side 1a and on a second side 1b of the first component 1. This results in a positively locking connection between the ball and the first component 1.

In the sectional illustration which is shown in FIG. 2, the plastically deformed edge region of the lower ball 7b has the form of a clamp which extends over the entire circumference of the ball 7b. The clamp has a generally U-shape which extends over the entire circumference of the ball 7b. The limbs of the U-shape protrude radially to the outside in relation to the through hole 2 and project beyond the through hole 2 from the top and from the bottom, which results in a positively locking connection between the first component 1 and the ball 7b. It is to be noted expressly that the ball 7b does not necessarily have to be deformed plastically along its entire extent. It is also contemplated that the ball 7b is deformed plastically only along a circumferential partial section or along a plurality of circumferential partial sections.

The ball 7b is therefore symmetrical with regard to a perpendicular bisector of the through hole 2 even after reshaping or deforming. If the pressing tools 5, 6 are pressed together to a sufficiently pronounced extent, the lower ball 7*b* is connected fixedly to the first component not only in a translational manner, but rather is also connected fixedly to the first component 1 via a frictional connection so as to rotate with it.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for connecting a ball to a first component, the method comprising the acts of:
    providing a first component having a through-hole;
    providing a ball, and inserting the ball into the through-hole such that the ball protrudes out of the first component at opposite sides of the first component;
    placing a first pressing tool on the ball from a first side of the first component, and placing a second pressing tool on the ball from a second side of the first component;
    plastically deforming the ball by pressing together the first and second pressing tools, wherein material of the ball flows both on the first side and on the second side of the first component such that the material of the ball projects beyond an edge of the through hole on the first side and on the second side of the first component, whereby a positively locking connection is produced between the ball and the first component.

2. The method as claimed in claim 1, wherein the ball is inserted into the through hole such that the ball projects out of the first component to approximately or exactly the same extent on the first side and on the second side of the first component.

3. The method as claimed in claim 1, wherein the ball is made of a metal material.

4. The method as claimed in claim 1, wherein the ball is made of steel or aluminum.

5. The method as claimed in claim 1, further comprising the act of:
    before being plastically deformed, the ball is connected fixedly to a second ball in order to form a double ball.

6. The method as claimed in claim 1, further comprising the act of:
    subsequently to being plastically deformed, the ball is connected to a second ball.

7. The method as claimed in claim 1, wherein, as viewed in a direction of a perpendicular bisector of the through-hole, the first and/or the second pressing tool acts on the ball in a radial outer region of the ball, and material of the ball is made to flow radially to the outside in a radial outer region of the ball.

8. The method as claimed in claim 1, wherein the first pressing tool is of a sleeve-shaped configuration, an end side of the first pressing tool being pressed against the ball in a radial outer region of the ball during pressing together of the first and second pressing tools.

9. The method as claimed in claim 8, wherein the second pressing tool is of a sleeve-shaped configuration, an end side of the second pressing tool being pressed against the ball on a radial outer region of the ball during pressing together of the first and second pressing tools.

10. The method as claimed in claim 1, wherein the first component is clamped in between a first hold-down device and a second hold-down device.

11. The method as claimed in claim 10, wherein a recess is provided in the first hold-down device, in which recess the first pressing tool is displaced.

12. The method as claimed claim 11, wherein a recess is provided in the second hold-down device, in which recess the second pressing tool is displaced.

* * * * *